United States Patent
Depay et al.

(10) Patent No.: US 7,854,420 B2
(45) Date of Patent: Dec. 21, 2010

(54) MOUNTING CLIP AND SYSTEM FOR ATTACHING OBJECTS TO A COMPUTER MONITOR

(75) Inventors: Dean Depay, Cupertino, CA (US); Benjamin Abraham, Cupertino, CA (US); Frederic Frappereau, Menlo Park, CA (US); Ray Gradwohl, Los Gatos, CA (US); Jacques Gagne, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 619 days.

(21) Appl. No.: 11/591,686

(22) Filed: Nov. 1, 2006

(65) Prior Publication Data

US 2008/0099636 A1     May 1, 2008

(51) Int. Cl.
*A47G 1/10*     (2006.01)
(52) U.S. Cl. .................... 248/316.7; 248/918
(58) Field of Classification Search ............... 248/689, 248/687, 690, 51, 73, 74.2, 222.12, 225.21, 248/231.81, 316.7, 918, 692, 301, 304, 339; 24/457, 458
See application file for complete search history.

(56) References Cited

U.S. PATENT DOCUMENTS

| | | | |
|---|---|---|---|
| 4,566,660 A * | 1/1986 | Anscher et al. ............ 248/74.2 |
| 4,681,288 A * | 7/1987 | Nakamura ................... 248/71 |
| 5,593,124 A * | 1/1997 | Wang ..................... 248/231.81 |
| 5,970,161 A | 10/1999 | Takashima et al. |
| 5,979,724 A * | 11/1999 | Loewenthal et al. ........ 224/483 |
| 6,138,969 A * | 10/2000 | Olausson ............... 248/222.52 |
| 6,449,145 B1 | 9/2002 | Buller et al. |
| 6,491,194 B2 * | 12/2002 | Marvin ....................... 224/483 |
| 6,679,463 B1 * | 1/2004 | Chen ......................... 248/126 |
| 6,822,857 B2 * | 11/2004 | Jung et al. ............. 361/679.02 |
| 6,845,954 B1 | 1/2005 | Moayer et al. |
| 7,182,299 B2 * | 2/2007 | Takeuchi ..................... 248/71 |
| 7,202,903 B2 * | 4/2007 | Lin et al. ..................... 348/373 |
| 7,404,548 B2 * | 7/2008 | Kwilosz ................. 267/140.13 |
| 2005/0211861 A1 * | 9/2005 | Lee et al. ................. 248/309.1 |
| 2005/0213290 A1 | 9/2005 | Lauffer et al. |
| 2006/0073795 A1 * | 4/2006 | Mayblum et al. .......... 455/90.2 |
| 2007/0120024 A1 * | 5/2007 | Oddsen et al. ........... 248/122.1 |

\* cited by examiner

*Primary Examiner*—A. Joseph Wujciak, III (57) ABSTRACT

Embodiments of mounting clips are described. One such embodiment of a mounting clip for attaching an object, device, or portion of a device to a computer monitor comprises a main body. At least one hook-shaped rib is coupled to the main body. The at least one rib is removably insertable within an opening in the computer monitor. A foot, coupled to the main body, contacts an exterior surface of the computer monitor while the at least one rib is inserted within the opening. A holder receptacle is coupled to the main body and provides a mating point for coupling an object to the mounting clip.

5 Claims, 5 Drawing Sheets

MOUNTING CLIP AND SYSTEM FOR ATTACHING OBJECTS TO A COMPUTER MONITOR

BACKGROUND

As computers continue to see increasing use in society, users have begun adding an assortment of objects and peripheral devices to their computers that increase the utility of their computers. One example of such a peripheral device is a web camera, otherwise known as webcam. A problem associated with these assorted objects and peripheral devices is that they take up space in the area surrounding a computer, creating clutter and potentially using up valuable workspace, for instance, in an office cubicle or on a desk. Another difficulty experienced with some devices, such as with external webcams, is that it is often difficult to utilize the device and the computer at the same time if the device is not properly positioned relative to the user.

A partial solution to these problems is to mount the device somewhere near the computer such as on the monitor. For instance, a webcam device can often be perched atop a computer monitor and pointed at the user. A drawback with this perching approach is that the device can fall off of the computer monitor or easily become misaligned if there is nothing to physically hold it in place.

Another approach is to physically attach the device the computer monitor so that it cannot easily fall off. Following such an approach, a device or a holder for a device can be affixed with an adhesive or perhaps with screw-type fasteners. This mounting solution works, but it is rather permanent and therefore not readily adjustable if the user dislikes the mounting location or position of the peripheral device that is attached to the mount. Another drawback is the permanence itself; that is, such a mounting may permanently mark or damage exterior surfaces of a computer monitor, especially if the user decides to remove the device or the mounting for the device at some point after it has been installed or mounted.

Yet another solution is a non-permanent clamp-type mounting that secures a peripheral device to a protrusion on a computer monitor through use of a spring-equipped clamp or some other clamping means. It may be possible to use such a clamp mounting to clamp to the monitor itself in the case of many flat screen LCD (Liquid Crystal Display) type monitors that have a fairly thin profiles. One drawback is that such a clamp type mount is unsightly. Another drawback is that when clamping directly to a monitor, such as an LCD type monitor, potential mounting areas often have sloped sides, thus causing such a clamp-type mounting to be unsuitable, or to fall off immediately or gradually over-time, or to slide off of the original surface and onto the display itself, thereby damaging the display.

DESCRIPTION OF THE DRAWINGS

The accompanying drawings, which are incorporated in and form a part of this specification, illustrate embodiments of the presented technology for a mounting clip and system for attaching objects to a computer monitor and, together with the description, serve to explain the principles of the presented technology. The drawings referred to in this description should not be understood as being drawn to scale unless specifically noted.

DETAILED DESCRIPTION

Reference will now be made in detail to various embodiments of the presented technology for a mounting clip and system for attaching objects to a computer monitor, examples of which are illustrated in the accompanying drawings. While the technology will be described in conjunction with these embodiments, it will be understood that they are not intended to limit the technology to these embodiments. On the contrary, the technology is intended to cover alternatives, modifications and equivalents, which may be included within the spirit and scope as defined by the appended claims. Furthermore, in the following description, numerous specific details are set forth in order to provide a thorough understanding.

Figure 1:
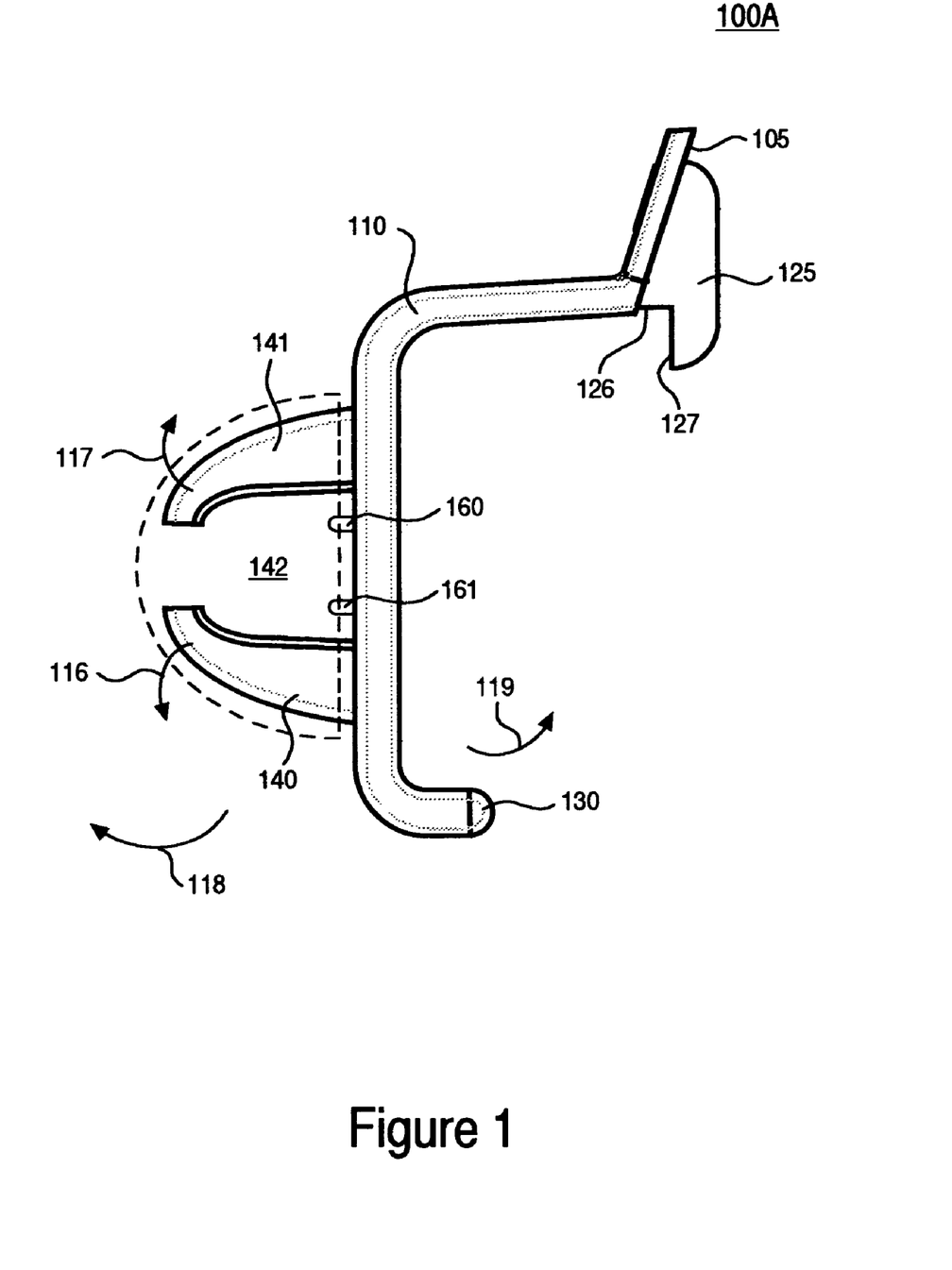
FIG. 1 is a side view of an exemplary mounting clip according to one embodiment.

FIG. 1 is a side view of an exemplary mounting clip 100A according to one embodiment. In the illustrated embodiment, mounting clip 100A is comprised of a main body 110, a plurality of ribs (only rib 125 is visible in FIG. 1), a foot 130, and a holder receptacle 142. Mounting clip 100A is designed to be removably attachable to an exterior surface of a computer monitor. In some embodiments, ribs from mounting clip 100A hook into openings, such as vent slot openings on the rear (non-display side) of a computer monitor. When affixed to a computer monitor, mounting clip 100A provides an attaching point for holding an object or peripheral device such as a web camera, microphone, document holder, cable, or other item, object, or peripheral device that a user may desire to mount on a computer monitor.

In some embodiments, main body 110 is semi-rigid and is made of, for example, a plastic material. In some embodiments, main body 110 is rigid. Holding receptacle 142, face 105, and ribs 120-125 (better seen in FIG. 3), are all coupled to main body 110. In some embodiments, main body 110, face 105, ribs 120-125, and holding receptacle 142 are all injection molded as a single piece plastic part. In some embodiments, foot 130 is made of a different material than the remainder of mounting clip 100A and is mechanically coupled by means such as tab fasteners or adhesives to main body 110. In some embodiments (not shown), foot 130 is formed as an integral portion of main body 110 and is comprised of the same material as main body 110.

Figure 2:
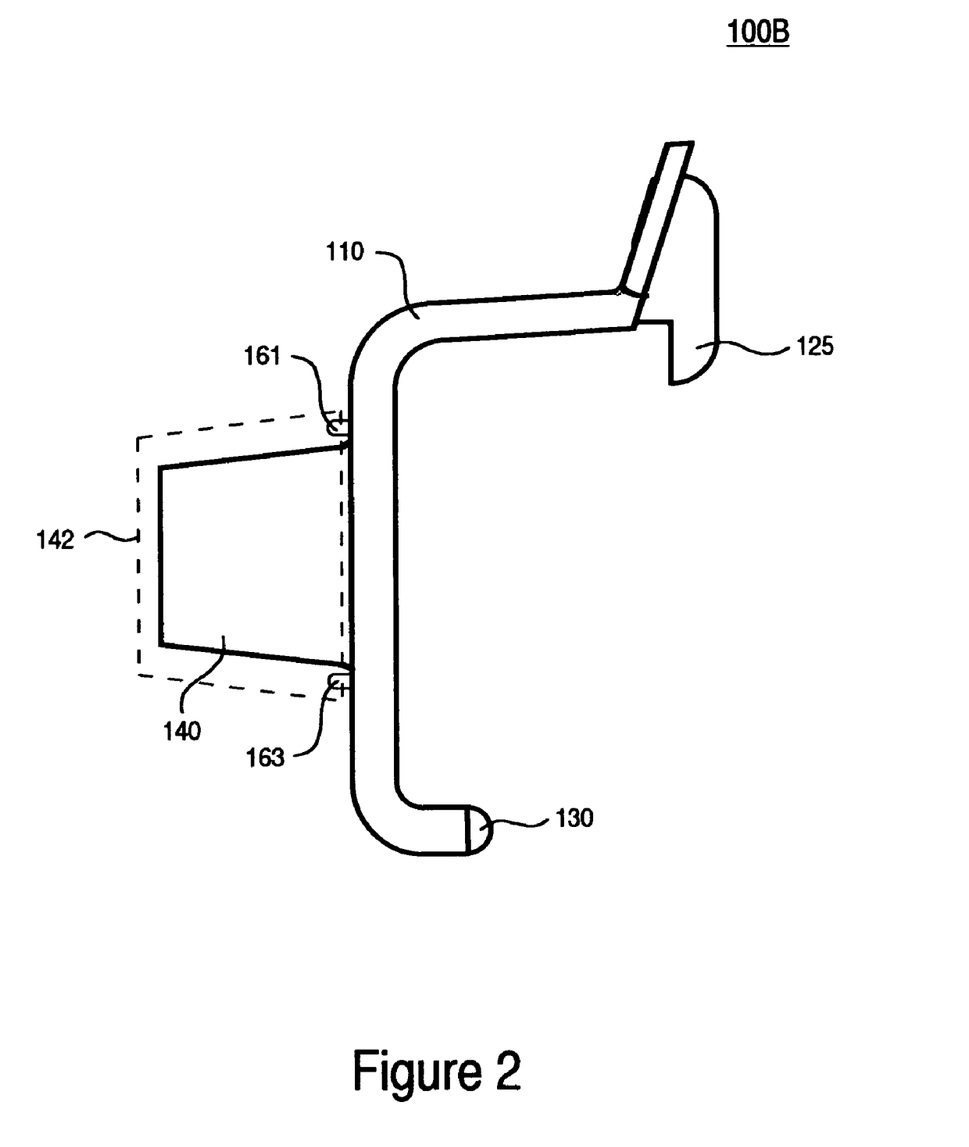
FIG. 2 is a side view of an exemplary mounting clip according to one embodiment.
Figure 3:
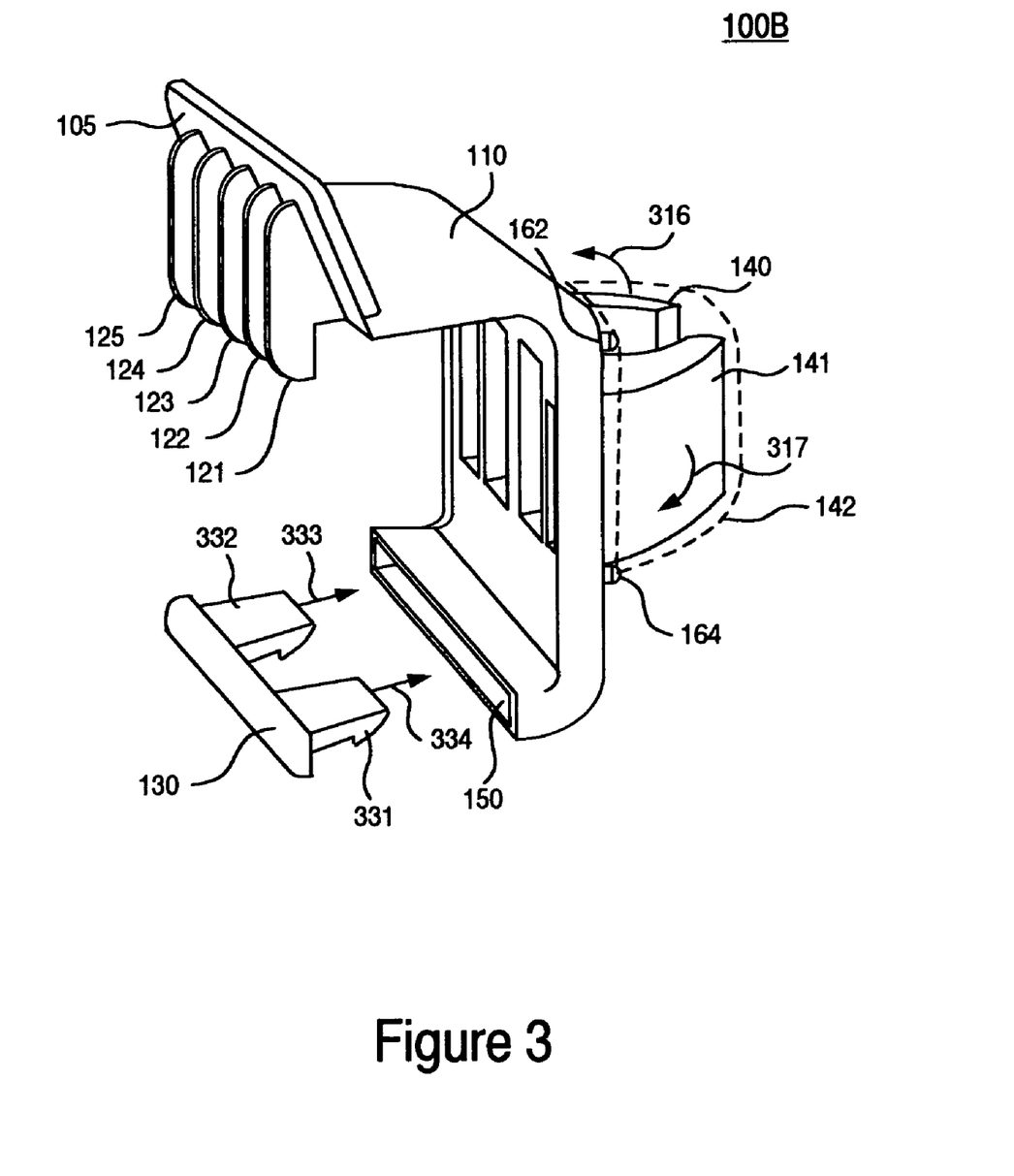
FIG. 3 is an exploded three-quarters view of an exemplary mounting clip according to one embodiment.

In the displayed embodiment, holding receptacle 142 is coupled to main body 110 and protrudes outward from main body 110 in the form of two fingers (140 and 141) of a C-shaped clasp that is used to grip or hold various items or portions of objects, such as mounting arms, overmolds, or portions of peripheral devices. Overmolds, as defined herein, comprise a molded layer formed around a previously molded part. The open space between fingers 140 and 141 enables an object to be inserted into holder receptacle 142. As an object to be gripped is inserted into holder receptacle 142, finger 141 flexes slightly in direction 117, while finger 140 flexes slightly in direction 116. Upon insertion of the object to be gripped, fingers 141 and 142 move toward their un-flexed positions, thus exerting positive gripping force on the inserted object and holding it firmly in place until it is adjusted or removed by a user. Other variations and/or orientations of holding receptacle 142 are possible in other embodiments. For instance, FIGS. 2 and 3 show an embodiment where holding receptacle 142 is rotated by ninety degrees from the orientation displayed in FIG. 1.

In some embodiments, holding receptacle 142 also comprises optional guides such as guides 161 and 162 located at the base of the opening formed by fingers 140 and 141. In some embodiments an optional second pair of guides 163 and 164 (not visible), symmetrical to guides 161 and 162, is located opposite guides 161 and 162 at the other side of the opening formed by fingers 140 and 141. Optional guides such as guides 161-164 protrude slightly from main body 110 and work in concert with fingers 140 and 141 to position various items, objects, overmolds, or portion of a peripheral device inserted into holder receptacle 142.

In FIG. 1, face 105 of main body 110 is for interfacing with the exterior surface of a computer monitor when ribs 120-125 (see FIG. 3) are inserted into openings, such as ventilation slots in an exterior surface of a computer monitor. Face 105 works to evenly spread forces created by deflection of main body 110 and by the weight of any device or object, such as a web camera, that is mounted in clip 100A, while clip 100A is attached to a computer monitor. Face 105 spreads such forces across external surface areas of the monitor with which it contacts while mounting clip 100A is mounted to a monitor.

In the displayed embodiment, ribs 120-125 (only 125 is visible, but others are better seen in FIG. 3 and FIG. 5) are hook-shaped and are configured to be inserted into openings, such as ventilation slots or other openings or indentations, in the external surface of a monitor. In the displayed embodiments, five ribs are utilized. It is appreciated however, that other embodiments can use as little as one rib, or employ more than five ribs. In some embodiments, spacing between the various ribs in a plurality of ribs is such that each rib is configured to fit into an opening in the computer monitor that mounting clip 100A is designed to interface with. Utilizing rib 125 as an example, each additional rib has a surface similar to surface 126 that is intended to rest on the lower edge that defines the opening in the computer monitor that the rib is inserted in. In such an embodiment, each additional rib also has a surface similar to surface 127 that interfaces with an interior surface of the monitor located slightly below the opening that rib 125 protrudes through. Surfaces such as 126 distribute weigh load of mounting clip 100A, while surfaces such as 127 help to latch mounting clip 100A firmly in place. In other embodiments, rib 125 can be hooked onto a rung-type hooking location that comprise a mounting bar or edge on or attached to an external surface of a monitor.

Foot 130 is for interfacing with an exterior surface. In some embodiments, foot 130 is comprised of a resilient non-marring material, such as rubber, soft plastic, or silcone. A resilient non-marring material helps prevent foot 130 from marking, scratching, or denting the exterior surface that mounting clip 100A is mounted on. In some embodiments foot 130 is formed separately from the remainder of mounting clip 100A and is then mechanically coupled with main body 110. Means such as tab and slot, adhesive, or friction fit can be used to attach foot 130 to main body 110. In other embodiments, foot 130 is formed as an integral portion of main body 110 and is comprised of the same material, such as plastic, of which main body 110 is constructed.

Arrow 118 shows a direction of flexing experienced by deflectable main body 110, when mounting clip 100A is mounted on a monitor. The deflection of main body 110 in direction 118 preloads mounting clip 110A with a force that pulls face 127 of rib 125 in direction 118, and thus presses face 127 firmly against the interior surface of the monitor. The preloaded force from the deflection in direction 118 also presses face 105 of main body 110 firmly against the exterior of, in the present example, the monitor. The preloaded force created by deflection in direction 118 also creates a spring-type force in direction 119 that presses foot 130 firmly against the exterior of the monitor.

FIG. 2 is a side view of an exemplary mounting clip 100B according to one embodiment. In the illustrated embodiment, mounting clip 100B is comprised of a main body 110, a plurality of ribs (only rib 125 is visible), a foot 130, and a holder receptacle 142. Mounting clip 100B shows an alternative embodiment of mounting clip 100A. Mounting clip 100B is identical in every respect to previously described mounting clip 100A, except that holder receptacle 142 has been rotated by ninety degrees.

Holder receptacle 142 operates in the same fashion as previously described in conjunction with FIG. 1 and mounting clip 100A. Holder receptacle 142 is still comprised of two fingers 141 and 140, however due to the ninety-degree rotation of holder receptacle 142, only finger 140 is visible in FIG. 2. Additionally, due to the rotation, optional guide 161 now obscures the view of optional guide 162. Also, due to the rotation of holder receptacle 142, optional guide 163 is visible, though optional guide 164 is obscured from view.

FIG. 3 is an exploded three-quarters view of an exemplary mounting clip 100B according to one embodiment. In the illustrated embodiment, mounting clip 100B is comprised of a main body 110, a plurality of ribs 121-125, a foot 130, and a holder receptacle 142. Mounting clip 100B shows an alternative embodiment of mounting clip 100A. As previously indicated mounting clip 100B is identical in every respect to previously described mounting clip 100A, except that holder receptacle 142 has been rotated by ninety degrees.

In the displayed embodiment of FIG. 3, the construction of holder receptacle 142 is more easily discerned, as the C-shaped clasp formed by fingers 140 and 141 is visible. Additional portions of holder receptacle 142 are also appreciable. Two optional guides (162 and 164), which form a portion of holder receptacle 142, are visible, while two optional guides (161 and 163 shown in FIG. 2) are not visible. Likewise, as previously described in conjunction with FIG. 1 and mounting clip 100A, the open space between fingers 141 and 142 of mounting clip 100B enables an object to be inserted into holder receptacle 142. As an object to be gripped is inserted into holder receptacle 142, finger 141 flexes slightly in direction 317, while finger 140 flexes slightly in direction 316. Upon insertion of the object to be gripped, fingers 140 and 141 move toward their un-flexed positions, thus exerting positive gripping force on the inserted object and holding it firmly in place until it is adjusted or removed by a user.

In FIG. 3, foot 130 is shown separately from main body 110. In the displayed embodiment, foot 130 is made of a rubber material and also comprises tabs 331 and 332 which latch into slots within opening 150 of main body 110. It will be appreciated that foot 130 may be made of flexible rubber-like non-marring material while tabs 331 and 332 are made of less flexible plastics or other types of material. Arrows 333 and 334 show the direction of insertion of tabs 331 and 332 within opening 150. As shown, foot 130 is inserted into opening 150 defined in main body 110. Upon being fully inserted into opening 150, tabs 331 and 332 latch into slots to mechanically couple foot 130 to main body 110 of mounting clip 100B. In some embodiments, a similar method of attachment is used to couple foot 130 to main body 110 of mounting clip 100A. In other embodiments, other means such as adhesives, friction fit, rivets, screws, or the like are utilized to attach foot 130 to main body 110. Foot 130 is designed to contact the exterior surface of a computer monitor when mounting clip 100A or 100B is mounted to the computer monitor with ribs 120-125 inserted within openings in the computer monitor.

In FIG. 3, face 105 of main body 110 is more readily visible. As shown, face 105 is canted at an angle to the remainder of main body 110. The slope of face 105 is configured to interface with a similarly sloped exterior surface of a monitor. It should be appreciated that the slope of face 105 can vary in other embodiments depending on the monitor or range of monitors with which a mountings clip is designed to function.

In FIG. 3, ribs 121-125 are shown protruding from sloped face 105 of main body 110. Though five ribs are shown, as previously indicated, more or less are possible in other embodiments. The ribs are shown with uniform thickness and separation, though in other embodiments, the individual rib thicknesses, as well as the separations between the ribs, can be varied to match the sizes and layouts of opening patterns in a particular monitor with which a mounting clip (100A or 100B) is designed to be utilized. The plurality of ribs 121-125 is designed to be removably insertable into openings in the exterior of a computer monitor. Because ribs 121-125 protrude from a sloping face 105, they are particularly suited for insertion into openings such as ventilation slot openings located on a sloped exterior surface of a monitor.

Figure 4:
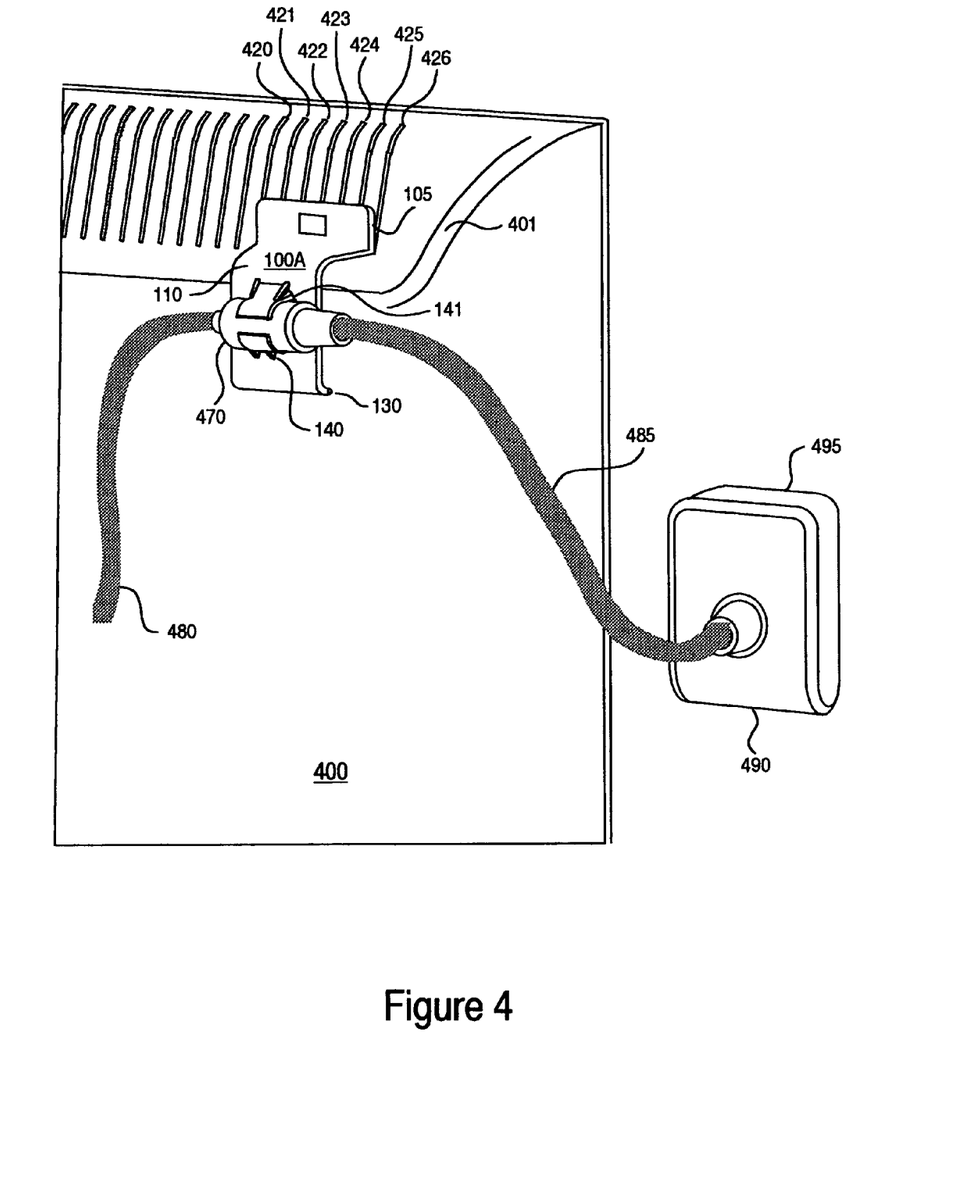
FIG. 4 illustrates an exemplary system for attaching devices to a computer monitor, in use with an exemplary computer monitor, according to one embodiment.

FIG. 4 illustrates an exemplary system for attaching a device 495 to a computer monitor, in use with an exemplary computer monitor 400, according to one embodiment. The system for attaching devices to a computer monitor is comprised of mounting clip 100A, an arm 485, an optional overmold 470, and an optional attaching point 490. Peripheral device 495 represents the device, object, item, or portion thereof to be mounted, and can comprise various devices such as a document holder, picture frame, cellular phone holder, note pad holder, web camera, lamp, flower vase, mirror, microphone, speaker or other similar object, item, or peripheral device that a user may desire to have mounted in close proximity to a computer monitor.

In FIG. 4, exemplary computer monitor 400 is a liquid crystal display (LCD) type monitor, with a thin profile comprised of rear edge surfaces that slope down to a flat exterior rear surface. It should be appreciated that the displayed embodiments are exemplary, and that in other embodiments, dimensions of mounting clips 100A and 100B can be altered as required to enable embodiments to operate with a variety of computer monitors.

In FIG. 4, the top rear sloped-edge surface of computer monitor 400 is comprises a plurality of ventilation slot openings. Seven of these ventilation slots are labeled (420-426). Mounting clip 100A is shown mounted to the rear exterior surface of monitor 400. Ribs 121-125 have been inserted within ventilation slots 421-425 respectively. Sloped exterior surface 105 of main body 110 is interfacing with the sloped exterior surface of computer monitor 400 in the area surrounding inserted ribs 121-125. Main body 110 arches over ridge 401 of the rear exterior of monitor 400, to place foot 130 into contact with a substantially flat surface of the exterior of monitor 400. Fingers 140 and 141 are shown firmly gripping overmold 470.

In the displayed embodiment, overmold 470 is coupled to arm 485. Also in the displayed embodiment, overmold 470 has a hollow interior that enables cable 480 to pass through into arm 485 and onward toward peripheral device 495. In some embodiments, overmold 470 and arm 485 are fashioned as a single part.

In the embodiment displayed in FIG. 4, arm 485 is comprised of a flexible hollow steel tubing that serves as a conduit that enables power and interface cables, such as cable 480, to be routed internally through arm 485 and then coupled to the attached peripheral device 495. Due to its flexible nature, arm 485 can be repositioned in a variety of positions to alter the position of the attached peripheral device 495 relative to monitor 400 and to a user. In other embodiments, arm 485 is comprised of a hollow rigid tube, a solid rigid shaft, or a solid flexible shaft that can be made of any of a variety of materials such as plastics, woods, or metals. Composition and structure of arm 485 vary depending upon the type of peripheral device being attached, and the functionality needed. For instance, where peripheral device 495 is a document holder, a solid flexible plastic shaft might be utilized, since no internal cabling needs to be routed through an arm that terminates in the document holder peripheral.

In the embodiment displayed in FIG. 4, arm 485 is coupled to an optional attaching point 490 for attaching to peripheral device 495. In one embodiment, attaching point 490 may simply be a collar that couples arm 485 to peripheral device 495. In other embodiments, attaching point 490 is a ball that couples to a socket in a peripheral device such as device 495 providing for a range of movement and rotation of peripheral device 495 on the end of arm 485. In one embodiment, attaching point 490 is an overmold that couples arm 485 to peripheral device 495. In an embodiment where attaching point 490 is an overmold, the overmold may be a separate part, or else formed as a portion of either arm 485 or peripheral device 495. Attaching point 490 is optional if it is included as a portion of the peripheral device, or if arm 485 couples directly to a peripheral device without the need for an intermediary coupling.

Figure 5:
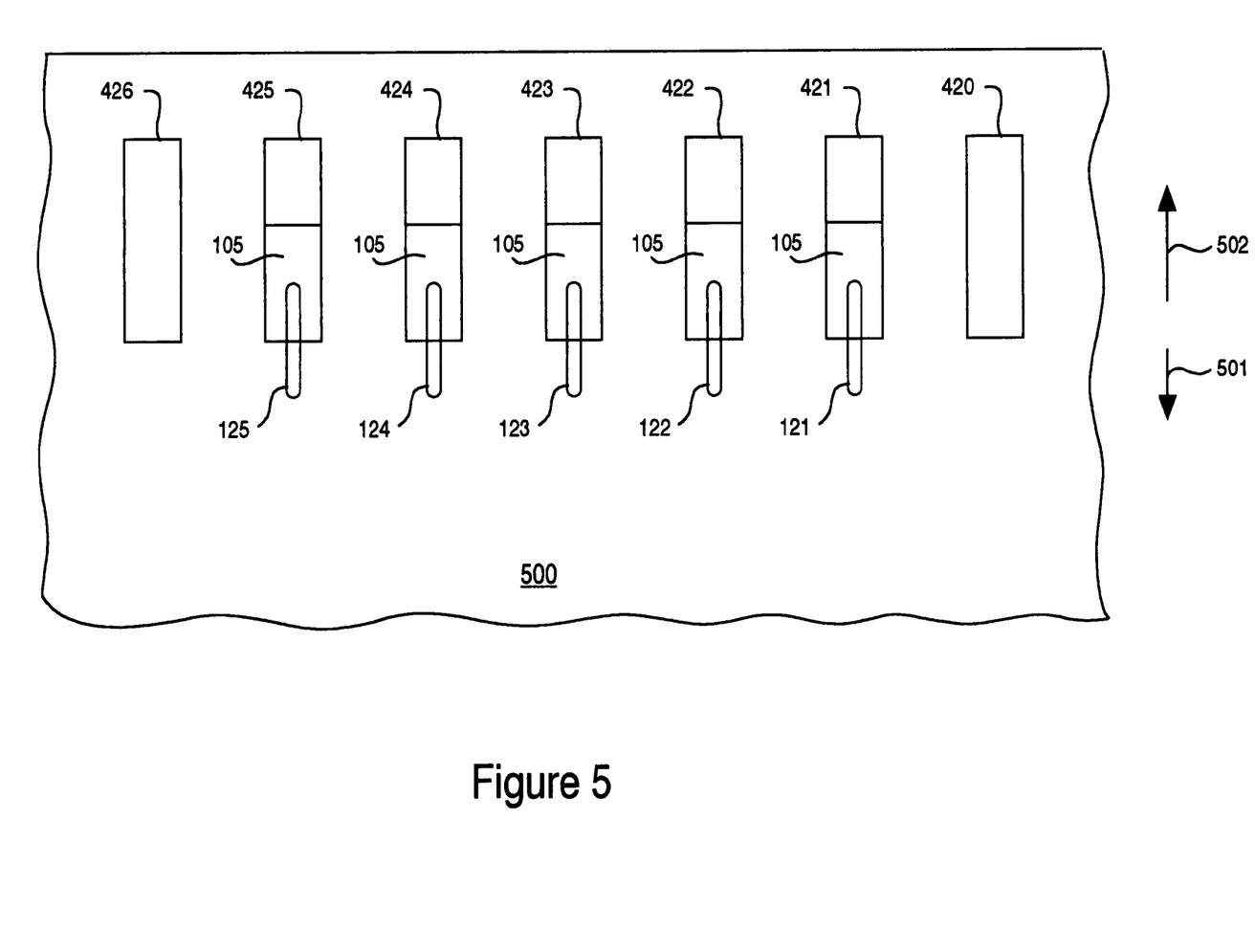
FIG. 5 is an interior view of an exemplary computer monitor illustrating ribs from an exemplary mounting clip engaged in openings of the exemplary computer monitor according to one embodiment.

FIG. 5 is an interior view of an exemplary computer monitor 400 illustrating ribs from an exemplary mounting clip 100A engaged in openings of the exemplary computer monitor 400 according to one embodiment. Surface 500 of FIG. 5 represents an interior surface of an exemplary monitor, such as monitor 400. Vertical vent slots 420-426 from FIG. 4 are shown in detail in FIG. 5. FIG. 5 displays surface 105, visible in vent slot openings 421-425. Vent slots 420 and 426 are empty, while vent slots 421-425 each has a rib (121-125) protruding through it from surface 105. Each hook shaped rib 121-125 rests on the bottom edge of its respective vent slot and interfaces with interior surface 500 of the exemplary monitor.

FIG. 5 demonstrates how ribs 121-125 of mounting clip 100 interface with the interior surface of the monitor when mounting clip 100 is fully seated. To fully seat ribs 121-125 of mounting clip 100 into openings 421-425, a user inserts ribs 121-125 into selected slots and pulls downward in direction 501. In FIG. 5 ribs 121-125 are shown fully seated, with rib 121 hooked into vent slot 421, rib 122 hooked into vent slot 422, rib 123 hooked into vent slot 423, rib 124 hooked into vent slot 424, and rib 125 hooked into vent slot 425. After being inserted into the vent slots 421-425 and seated or hooked into place, a surface such as surface 126 of rib 125 (FIG. 1) of each rib 121-125 rests against on the bottom edge of the rib's respective vent slot 421-425. A second surface of each of the ribs 121-125, similar to surface 127 of rib 125 (FIG. 1) is in contact with surface 500. This hooking action provided by ribs 121-125 holds mounting clip 100A (or alternatively 100B) firmly in place on the back side of monitor 400 (as shown in FIG. 4), and provides a secure foundation for attaching various objects and peripheral devices.

FIG. 5 also demonstrates one direction of movement utilized to remove mounting clip 100. A user lifts main body 110

(see FIG. 4) in direction 502, causing ribs 121-125 to become unseated and thus facilitating easy removal of ribs 121-125 from openings 421-425, and removal of mounting clip 101A (or 101B) from the monitor.

Although vertical vent openings are described for receiving a rib or ribs of mounting clip 100, it is appreciated that other openings, indentations, or rungs may be utilized to gain purchase for a rib or ribs of mounting clip 100. It is further appreciated that, in some embodiments, such openings indentations, or rungs are oriented at other angles, such as horizontal. Additionally, in some embodiments, ventilation slots, indentations, openings, or rungs may be created for the express purpose of receiving ribs, such as ribs 120-125.

What is claimed is:

1. A mounting clip configured to attach to an object to a computer monitor, said mounting clip comprising:
    a main body including a face for interfacing with an exterior surface of said computer monitor, wherein said face is canted at an angle to a remainder of said main body;
    at least one hook shaped rib coupled to said face of said main body, said at least one rib removably insertable within an opening in said computer monitor;
    a foot coupled to said main body, wherein said foot contacts an exterior surface of said computer monitor while said at least one rib is inserted within said opening; and
    a holder receptacle coupled to said main body, wherein said holder receptacle provides a mating point for coupling an object to said mounting clip;
    wherein said foot comprises a resilient non-marring material, to prevent said exterior surface of said computer monitor from being marred by interaction with said mounting clip.

2. The mounting clip of claim 1, wherein said non-marring material comprises a rubber material.

3. A mounting clip configured to attach to an object to a computer monitor, said mounting clip comprising:
    a main body including a face for interfacing with an exterior surface of said computer monitor, wherein said face is canted at an angle to a remainder of said main body;
    at least one hook shaped rib coupled to said face of said main body, said at least one rib removably insertable within an opening in said computer monitor;
    a foot coupled to said main body, wherein said foot contacts an exterior surface of said computer monitor while said at least one rib is insetted within said opening; and
    a holder receptacle coupled to said main body, wherein said holder receptacle provides a mating point for coupling an object to said mounting clip;
    wherein said holder receptacle comprises a two-part clasp configured for coupling with said object.

4. The mounting clip of claim 3, wherein said two-part clasp is configured to grip a portion of an object.

5. The mounting clip of claim 3, wherein said two-part clasp comprises a flexible material.

* * * * *

UNITED STATES PATENT AND TRADEMARK OFFICE
CERTIFICATE OF CORRECTION

| | |
|---|---|
| PATENT NO. | : 7,854,420 B2 |
| APPLICATION NO. | : 11/591686 |
| DATED | : December 21, 2010 |
| INVENTOR(S) | : Dean Depay et al. |

It is certified that error appears in the above-identified patent and that said Letters Patent is hereby corrected as shown below:

In column 8, line 17, in Claim 3, delete "insetted" and insert -- inserted --, therefor.

Signed and Sealed this
Fifth Day of April, 2011

David J. Kappos
*Director of the United States Patent and Trademark Office*